United States Patent [19]
Duhaut et al.

[11] 3,957,686
[45] May 18, 1976

[54] CATALYST FOR HYDROCARBON CONVERSION

[75] Inventors: Pierre Duhaut, Le Vesinet; Germain Martino, Poissy; Jean Miquel, Paris, all of France

[73] Assignee: Societe Francaise des produits pour Catalyse, Rueil-Malmaison, France

[22] Filed: Dec. 13, 1973

[21] Appl. No.: 424,200

[30] Foreign Application Priority Data
Dec. 13, 1972  France .............................. 72.44449

[52] U.S. Cl. ........................ 252/441; 252/466 PT; 208/138; 208/139; 260/683.3
[51] Int. Cl.² .................. B01J 27/08; B01J 23/64; C10G 35/08
[58] Field of Search ............. 252/466 PT, 441, 471; 208/138, 139

[56] References Cited
UNITED STATES PATENTS

| | | | |
|---|---|---|---|
| 1,345,323 | 6/1920 | Frazer et al. ........................ | 252/471 |
| 2,848,377 | 8/1958 | Webb .................................. | 208/138 |
| 2,848,510 | 8/1958 | Myers et al. ........................ | 252/471 |
| 2,911,357 | 11/1959 | Myers et al. ........................ | 208/138 |
| 3,180,839 | 4/1965 | Connor et al. ..................... | 252/471 |
| 3,388,074 | 6/1968 | Reitmeier ........................... | 252/471 |
| 3,655,747 | 4/1972 | Sennewald et al. ................ | 252/471 |
| 3,737,445 | 6/1973 | Dodman et al. .................... | 252/471 |
| 3,842,121 | 10/1974 | Ichikawa et al. .................. | 252/441 |
| 3,844,980 | 10/1974 | Sakai et al. ........................ | 252/471 |

Primary Examiner—Delbert E. Gantz
Assistant Examiner—James W. Hellwege
Attorney, Agent, or Firm—Millen, Raptes & White

[57] ABSTRACT

New catalyst containing a carrier, platinum, iridium, manganese and optionally halogen. This catalyst is useful for reforming and dehydrogenation of hydrocarbons.

7 Claims, No Drawings

CATALYST FOR HYDROCARBON CONVERSION

This invention concerns a new catalyst containing (a) a carrier, (b) platinum, (c) iridium and (d) manganese.

The invention further concerns the use of this catalyst in hydrocarbon conversion reactions, such as reforming and dehydrogenation.

Catalysts containing supported platinum are well-known, but, in spite of the many improvements brought to these catalysts, for example by incorporating additives such as tungsten, molybdenum, germanium, iridium, rhodium, etc . . . , researches are still conducted for finding new catalysts which on the one hand, would give improved yields, as compared with the present yields, and, on the other hand, would have a longer life than the known catalysts. Efforts are also devoted to improving the mechanical properties of these catalysts. These catalysts being conventionally used in fixed or moving bed, in the form of agglomerates, for example balls or extrudates, of appreciable size so as to leave a relatively easy passage to the gaseous reactants, the ageing of these catalysts results in the formation of far smaller grains which progressively clog the free space so that the inlet pressure of the reactants must be increased, or even the run stopped.

It was known that moderately good yields could be obtained in hydrocarbon reforming or dehydrogenation by using a catalyst comprising a porous carrier, for example alumina, together with platinum and iridium; it has now been found that this catalyst could acquire an improved activity by incorporating thereto manganese as a third element.

Now, by using a catalyst comprising a porous carrier together with platinum, iridium and manganese, the yields may be kept constant over long periods and the mechanical properties of the catalyst are improved; when associated with platinum, iridium results in a longer life of the catalyst but also in a loss of selectivity, mainly at the beginning of its life; it has now been observed that manganese compensates for this selectivity decrease.

The catalyst according to the invention contains (a) a carrier, (b) platinum, (c) iridium, (d) manganese, preferably in the form of manganese oxide, and (e), when necessary, halogen, for example chlorine or fluorine.

The carrier comprises at least one inorganic oxide of an element selected from groups II, III and IV of the periodic classification. Porous alumina, silica, alumina-silica, magnesia, etc . . . may be mentioned by way of examples.

The catalyst according to the invention contains, by weight with respect to the catalyst carrier, from 0.005 to 1%, particularly from 0.05 to 0.8% of platinum, from 0.005 to 1%, particularly from 0.01 to 0.09% of iridium and from 0.005 to 5%, particularly from 0.05 to 3% of manganese, the latter two percentages being expressed as manganese metal and not oxide.

If so desired, particularly when the carrier is alumina, the catalyst may also contain from 0.1 to 10% and preferably from 0.2 to 5% by weight of halogen, for example chlorine or fluorine, with respect to the catalyst carrier.

The catalyst may be prepared according to conventional methods consisting of impregnating the carrier with solutions of compounds of the desired metals.

We may use either a common solution of these metals, or separate solutions for each metal or group of metals. Aqueous solutions or solutions in hydrochloric acid or in an alcohol are prepared. When a plurality of solutions is used, intermediary drying or roasting steps may be carried out. A final roasting usually takes place, for example at about 500°–1000°C, preferably in the presence of free oxygen, for example by air scavenging.

As examples of manganese compounds we may mention the manganese nitrates, chlorides, bromides, fluorides, sulfates and acetates, or any other manganese salt soluble in water or in hydrochloric acid, for example manganese chloroplatinate.

Platinum may be used in any known form, for example as hexachloroplatinic acid, ammonium chloroplatinate, platinum sulfide, sulfate or chloride. Iridium may be used in any known form, for example as chloride, bromide, sulfate or sulfide or as hexachloroiridic, hexabromoiridic or hexafluoroiridic acid.

Halogen may be supplied as one of the above halides, or as hydrochloric or hydrofluoric acid, ammonium chloride, ammonium fluoride, gaseous chlorine or hydrocarbon halide, for example $CCl_4$, $CHCl_3$ or $CH_3Cl$.

A first method of manufacture consists, for example, of impregnating the carrier by means of an aqueous solution of manganese nitrate or another manganese compound, drying at about 120°C and roasting in air for a few hours at a temperature of from 500° to 1000°C, preferably about 700°C and carrying out a second impregnation by means of a solution containing platinum and iridium, for example a solution of hexachloroplatinic and hexachloroiridic acids.

Another method consists of impregnating the carrier by means of a common solution of:

1. platinum (for example as hexachloroplatinic acid)
2. iridium (for example as hexachloroiridic acid)
3. manganese (for example as manganese chloride, bromide, fluoride, sulfate or acetate, or any other manganese salt soluble in water or in hydrochloric acid, for example manganese chloroplatinate), and
4. chlorine or fluorine whenever desired.

A further method consists of supplying the metal elements by carrying out a number of successive impregnations equal to the number of metal elements of the catalyst; for example, we introduce first iridium by means of a solution thereof, followed, if desired, with drying and roasting steps; then platinum by means of a solution thereof, optionally followed with drying and roasting steps, and finally manganese, this latter impregnation being followed with a drying and roasting step at a temperature of, for example, from about 500° to about 1000°C.

It should be clearly understood that the above impregnation sequence is not binding and may be modified.

The porous carriers employed for manufacturing the catalyst according to the invention are well-known and will not be described in greater detail.

The so-obtained catalysts may be used in many known hydrocarbon conversion reactions, in place of the previously used platinum catalysts, for example in reforming, dehydrogenation, aromatization, dehydrocyclization, isomerization and hydrocracking reactions. These reactions are conventionally carried out within the broad temperature range of from 300° to 600°C. With particular respect to reforming, the latter is usually carried out at a temperature in the range of from about 450° to 600°C, under a pressure of from about 5 to 20 kg/cm², the hourly reaction rate being from 0.5 to 10 volumes of liquid feed (a naphtha distilling between about 60° and 220°C) per volume of catalyst. With respect to the dehydrogenation of saturated hydrocarbons (of from 3 to 40 carbon atoms per molecule), the latter is usually carried out at a temperature of from 300° to 600°C, under a pressure of from 0.1 to 20 kg/cm², the hourly reaction rate being from 0.1 to 30 volumes of liquid charge per volume of catalyst. The molar ratio hydrogen/hydrocarbons at the reactor inlet is usually 0.1–30.

The following examples illustrate the invention but are not intended to limit the scope thereof.

EXAMPLE 1

Two catalysts A and B are prepared, their specific surface being 230 m²/g, their pore volume 54 cc/g and their chlorine content 1%.

These catalysts have been prepared with an alumina having a specific surface of 240 m²/g and a pore volume of 59 cc/g.

The catalyst A has been prepared by admixing 100 g of alumina with 100 cc of an aqueous solution containing:

1.9 g of concentrated HCl ($d = 1.19$)
14 g of an aqueous chloroplatinic acid solution of a 2.5% by weight Pt content,
1 g of an aqueous chloroiridic acid solution of a 2% by weight Ir content, and
2.3 g of manganese nitrate.

The contact is maintained for 5 hours, then the catalyst is centrifuged, dried at 100°C for 1 hour and roasted at 530°C in dry air (drying with activated alumina). The catalyst is then reduced in a hydrogen stream (activated alumina) for 2 hours at 450°C. The catalyst contains, with respect to alumina (the amounts are given by weight):

0.35% of platinum
0.50% of iridium
0.50 % of manganese (expressed as manganese metal although present as manganese oxide)
1.10% of chlorine.

Catalyst B has been prepared according to the same method, but it does not contain manganese. Catalyst B contains 1.10% of chlorine. These catalysts are tested according to the n-heptane test.

The conditions are selected for having the same conversion rate when using the catalysts A and B. The experimental conditions are:
pressure : 20 bars
ratio H₂/HC (molar) : 5
naphtha weight/catalyst weight/hour : 3

The reactor inlet temperature is 490° ± 2°C. It is so selected for each catalyst that they give the same conversion (88% in the two cases).

Table I summarizes, for catalysts A and B, the molar yield of toluene, the amount of light hydrocarbons produced and the ratio toluene/light hydrocarbons which defines the selectivity of the catalyst. By light hydrocarbons, there is meant the $C_1$–$C_4$ cut.

The better the catalyst selectivity, the higher the ratio toluene/light hydrocarbons.

TABLE I

| Catalyst | | A | B |
|---|---|---|---|
| % Pt | b.w. | 0.35 | 0.35 |
| % Ir | b.w. | 0.02 | 0.02 |
| % Mn | b.w. | 0.5 | 0 |

TABLE I-continued

| Catalyst | A | B |
|---|---|---|
| % lights (molar) | 35.2 | 40.2 |
| % toluene (molar) | 25 | 24.3 |
| Toluene/light hydrocarbons (molar ratio) | 0.710 | 0.605 |

This table shows that manganese substantially improves the catalyst selectivity.

EXAMPLE 2

From example 1, it seems that the improved results obtained with catalyst A, when compared with catalyst B, result from the mere adding of manganese to catalyst A. However, when comparing in table II below (heptane test with the same operating conditions as in example 1) the results obtained with catalyst A to those obtained with catalysts C and D, these three catalysts having the same total content of metal elements except that catalysts C and D do not contain manganese, it appears that catalyst A gives the best results. The conversion is 88% with each catalyst.

Catalysts C and D have been prepared in the same manner as catalyst B. Their metal contents are given in table II and they contain 1.10% of chlorine.

TABLE II

| Catalyst | | A | C | D |
|---|---|---|---|---|
| % Pt | b.w. | 0.35 | 0.35 | 0.40 |
| % Ir | b.w. | 0.02 | 0.07 | 0.02 |
| % Mn | b.w. | 0.5 | 0 | 0 |
| % lights (molar) | | 35.2 | 40.2 | 40.2 |
| % toluene (molar) | | 25 | 24.2 | 24.3 |
| Toluene/light hydrocarbons (molar ratio) | | 0.710 | 0.602 | 0.605 |

EXAMPLE 3

This example shows (see table III below) the effect of the iridium concentration of the catalyst in a n-heptane test, under the same operating conditions as in example 1, for a 88% conversion. The total content of metals is the same in catalysts A, E and F, as well as the manganese content. Manganese is in the form of manganese oxide in catalyst A as well as in catalysts E and F.

Catalysts E and F, whose metal concentrations are given in table III (the manganese concentration is always expressed as elemental manganese), have been prepared according to the same method as used for manufacturing catalyst A. They contain 1.10% of chlorine.

Table III shows that an iridium concentration of 0.08% is satisfactory but a concentration of 0.15% (with respect to the catalyst carrier) is too high and detrimental to the catalytic activity.

TABLE III

| Catalyst | | A | E | F |
|---|---|---|---|---|
| % Pt | b.w. | 0.35 | 0.28 | 0.25 |
| % Ir | b.w. | 0.02 | 0.08 | 0.15 |
| % Mn | b.w. | 0.5 | 0.5 | 0.5 |
| % lights (molar) | | 35.2 | 35.5 | 46 |
| % toluene (molar) | | 25 | 24.9 | 24 |
| Toluene/light hydrocarbons (molar ratio) | | 0.710 | 0.700 | 0.520 |

EXAMPLE 4

This example illustrates (see table IV) the effect of the manganese concentration of the catalyst, in the same n-heptane test as in the above examples (conversion: 88%). Catalysts G to I and K to M whose metal contents with respect to alumina are given in table IV have been prepared according to a method identical to that used for manufacturing catalyst A. They all contain 1.10% of chlorine. The % content of manganese is expressed as elemental manganese although manganese is present in the form of manganese oxide.

TABLE IV

| Catalyst | Pt % b.w. | Ir % b.w. | Mn % b.w. | lights (mol %) | Toluene (mol %) | Ratio of toluene to light hydrocarbons (molar) |
| --- | --- | --- | --- | --- | --- | --- |
| A | 0.35 | 0.02 | 0.5 | 35.2 | 25 | 0.710 |
| G | 0.35 | 0.02 | 0.004 | 40.2 | 24.3 | 0.605 |
| H | 0.35 | 0.02 | 0.04 | 36.9 | 24.4 | 0.660 |
| I | 0.35 | 0.02 | 0.06 | 36.1 | 24.6 | 0.682 |
| K | 0.35 | 0.02 | 3.2 | 37.2 | 24.4 | 0.655 |
| L | 0.35 | 0.02 | 5 | 38.7 | 24.3 | 0.627 |
| M | 0.35 | 0.02 | 6 | 52 | 23 | 0.440 |

EXAMPLE 5

$C_{10}$–$C_{14}$ olefins must be produced by dehydrogenation of a normal paraffin cut.

A catalyst N is prepared by impregnating tetragonal alumina balls of a 69 m²/g specific surface and a 0.58 cc/g total pore volume (average pore diameter: 100–500 angstroms). 100 g of these alumina balls are impregnated with 58 cc of an aqueous solution containing 0.160 g of platinum in the form of chloroplatinic acid. The contact is maintained for 3 hours at the end of which the alumina balls have completely absorbed the solution. The balls are dried in an oven at 100°–110°C for 6 hours and then roasted in an air stream for 2 hours at 400°C and 2 hours at 500°C. The resulting catalyst contains 0.16% by weight of platinum with respect to the catalyst carrier. It has a specific surface of 64 m²/g and a pore volume of 0.52 cc/g. It contains practically no chlorine. Once cooled, the catalyst is charged into the dehydrogenation reactor where it is reduced at 530°C for about 12 hours with a hydrogen feed rate of 50 liters per hour.

In the same manner, three catalysts O, P and Q have been manufactured; catalyst O contains 0.16% by weight of platinum and 0.04% of iridium with respect to the catalyst carrier; catalyst P contains 0.16% of platinum and manganese oxide (0.08% of manganese expressed as metal element); catalyst Q contains 0.16% of platinum, 0.04% of iridium and manganese oxide (0.08% of manganese expressed as metal element). Catalysts O, P and Q have been prepared by impregnating 100 g of alumina with 58 cc of an aqueous solution containing:

Catalyst O : 0.160 g of platinum in the form of chloroplatinic acid and 0.04 g of iridium in the form of iridium chloride.

Catalyst P : 0.160 g of platinum in the form of chloroplatinic acid and 0.08 g of manganese in the form of manganese acetate.

Catalyst Q : 0.160 g of platinum in the form of chloroplatinic acid, 0.04 g of iridium in the form of iridium chloride and 0.08 g of manganese in the form of manganese acetate.

The $C_{10}$–$C_{14}$ cut is passed over each of the catalysts N, O, P and Q at a spatial velocity of 2 liquid volumes per volume of catalyst and per hour at a temperature of 460°–470°C, an absolute pressure of 1.5 bar and a molar ratio hydrogen/$C_{10}$–$C_{14}$ cut of 10 at the reactor inlet; the liquid and gaseous products issued from the reactor have been analyzed as a function of time, by bromine index determination, chromatography in gaseous phase, mass spectrometry and nuclear magnetic resonance; the results are summarized in table V.

Table V shows that catalyst N, which contains only platinum, has a poor stability (high decrease of the mono-olefin content in about 100 hours). Stability is improved by adding iridium (catalyst O); iridium addition also improves the catalyst activity. Catalyst P, which contains platinum and manganese, has a good stability but the activity of this catalyst is relatively poor. Conversely catalyst Q, which contains both platinum, iridium and manganese is stable, has a fairly good activity after 100 hours and is more selective after 100 hours than catalysts N, O and P.

Among the four catalysts N, O, P and Q, it appears that catalyst Q gives after 100 hours, on the one hand, the best yield of mono-olefins and, on the other hand, the lowest formation of by-products together with the lowest proportion of unconverted paraffins.

TABLE V

| Catalyst content b.w. | N 0.16% Pt | | O 0.16% Pt 0.04% Ir | | P 0.16% Pt 0.08% Mn | | Q 0.16% Pt 0.04% Ir 0.08% Mn | |
| --- | --- | --- | --- | --- | --- | --- | --- | --- |
| Age of the catalyst (hours) | 4 | 100 | 4 | 100 | 4 | 100 | 4 | 10 |
| Compositon b.w. of the liquid prod. | | | | | | | | |
| n-paraffins | 6.14 | 70.5 | 57.2 | 66.8 | 60.8 | 67.8 | 60.4 | 66.5 |
| n-mono-olefins | 32 | 25.3 | 34.5 | 28.6 | 30.5 | 26.8 | 34.5 | 30.1 |
| iso-olefins+Paraffins | 1.1 | 0.7 | 1.1 | 0.8 | 1.6 | 1.1 | 0.9 | 0.8 |
| diolefins | 0.9 | 0.6 | 0.9 | 0.6 | 1.6 | 1.1 | 0.7 | 0.5 |

TABLE V-continued

| Catalyst content b.w. | N 0.16% Pt | | O 0.16% Pt 0.04% Ir | | P 0.16% Pt 0.08% Mn | | Q 0.16% Pt 0.04% Ir 0.08% Mn | |
|---|---|---|---|---|---|---|---|---|
| aromatics % b.w. of the charge cracked | 4.2 | 2.6 | 4.2 | 2.1 | 5.3 | 3 | 3.2 | 1.9 |
| to $C_1$-$C_5$ hydrocarbons | 0.4 | 0.3 | 2.1 | 1.1 | 0.2 | 0.2 | 0.3 | 0.2 |

What we claim is:

1. A new catalyst consisting essentially of (a) alumina, (b) metallic platinum, (c) metallic iridium, (d) manganese in the form of manganese oxide and (e) halogen, the catalyst contents by weight with respect to the alumina being 0.005–1% of platinum, 0.005–1% of iridium, 0.005–5% of manganese expressed as manganese metal, and 0.1–10% of halogen in the form of halide.

2. A catalyst according to claim 1, wherein the content of manganese expressed as manganese metal is 0.05–3% by weight with respect to the catalyst carrier.

3. A catalyst according to claim 1, there being 0.2–5% of halogen in the form of halide by weight with respect to the catalyst carrier.

4. A catalyst according to claim 1, iridium being present in a concentration by weight of 0.01 to 0.09%.

5. A catalyst according to claim 4, manganese expressed as manganese metal being present in a concentration by weight of 0.05 to 3%.

6. A catalyst according to claim 5, platinum being present in a concentration by weight of 0.05 to 0.8%.

7. A catalyst according to claim 6, halogen being present in a concentration by weight of 0.2 to 5%.

* * * * *